US010907589B2

United States Patent

(12) United States Patent
Sakuma et al.
(10) Patent No.: US 10,907,589 B2
(45) Date of Patent: Feb. 2, 2021

(54) WORK VEHICLE

(71) Applicant: Kubota Corporation, Osaka (JP)

(72) Inventors: Tetsushi Sakuma, Sakai (JP); Akiyoshi Ono, Sakai (JP); Megumi Sawai, Sakai (JP); Daisuke Inaba, Sakai (JP); Shinji Kato, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/693,383

(22) Filed: Nov. 25, 2019

(65) Prior Publication Data

US 2020/0200128 A1 Jun. 25, 2020

(30) Foreign Application Priority Data

Dec. 20, 2018 (JP) ................................ 2018-238704

(51) Int. Cl.

| | |
|---|---|
| ***F02M 35/10*** | (2006.01) |
| ***B01D 46/24*** | (2006.01) |
| ***B60K 15/03*** | (2006.01) |
| ***F01N 3/00*** | (2006.01) |
| ***F01N 3/022*** | (2006.01) |
| ***F02F 1/24*** | (2006.01) |
| ***F02F 7/00*** | (2006.01) |
| ***F02M 25/06*** | (2016.01) |
| ***F02M 35/02*** | (2006.01) |
| ***F01M 11/00*** | (2006.01) |

(Continued)

(52) U.S. Cl.

CPC ....... *F02M 35/10222* (2013.01); *B01D 46/24* (2013.01); *B01D 50/002* (2013.01); *B60K 15/03* (2013.01); *F01M 11/0004* (2013.01); *F01M 13/04* (2013.01); *F01N 3/022* (2013.01); *F02F 1/24* (2013.01); *F02F 7/0043* (2013.01); *F02M 25/06* (2013.01); *F02M 35/02* (2013.01); *F02M 35/10144* (2013.01); *F02M 35/10157* (2013.01); *B01D 2279/30* (2013.01); *B62D 49/06* (2013.01); *F01M 2013/0472* (2013.01)

(58) Field of Classification Search

CPC .. F02M 35/10222; F02M 25/06; F02M 35/02; F02M 35/10144; F02M 35/10157; B01D 46/24; B01D 50/022; B01D 2279/30; B60K 15/03; F01M 11/0004; F01M 2013/0472; F01N 3/002; F02F 1/24; F02F 7/0043; B62D 49/06

See application file for complete search history.

(56) References Cited

U.S. PATENT DOCUMENTS

2013/0000277 A1* 1/2013 Uzkan ................ F02D 41/3058 60/274
2017/0211436 A1* 7/2017 Kurosaka ................ F01L 1/022

FOREIGN PATENT DOCUMENTS

JP 2017-129113 7/2017

* cited by examiner

*Primary Examiner* — Jacob M Amick
(74) *Attorney, Agent, or Firm* — Mori & Ward, LLP

(57) ABSTRACT

A work vehicle includes an engine, a particulate filter, and an oil separator. The particulate filter is connected to the engine to collect particulate matters contained in exhaust gas from the engine. The particulate filter is provided to overlap with the engine when viewed in a height direction along a height of the work vehicle. The oil separator is connected to the engine via a blow-by-gas discharge pipe to catch a liquid component in blow-by-gas from the engine. The oil separator is provided between the engine and the particulate filter to overlap with the particulate filter when viewed in the height direction.

20 Claims, 13 Drawing Sheets

(51) Int. Cl.

| | |
|---|---|
| ***B01D 50/00*** | (2006.01) |
| ***F01M 13/04*** | (2006.01) |
| *B62D 49/06* | (2006.01) |

WORK VEHICLE

CROSS-REFERENCE TO RELATED APPLICATIONS

The present application claims priority under 35 U. S. C. § 119 to Japanese Patent Application No. 2018-238704, filed Dec. 20, 2018. The contents of this application are incorporated herein by reference in their entirety.

BACKGROUND OF THE INVENTION

Field of the Invention

The present application discloses techniques relating to a work vehicle.

Discussion of the Background

There has been exemplified an engine fluid heating device disclosed in JP 2017-129113 A, which is also applicable to a work vehicle and the like. This device includes heaters each constituted by an IH coil and disposed at an oil passage for supply of fuel from a fuel tank to an engine, a blow-by-gas passage connecting a breather chamber and an oil separator in the engine, and the like. The heaters heat fluid passing through these passages to inhibit the fuel from freezing.

SUMMARY OF THE INVENTION

According to one aspect of the present invention, a work vehicle includes an engine, a particulate filter, and an oil separator. The particulate filter is connected to the engine to collect particulate matters contained in exhaust gas from the engine. The particulate filter is provided to overlap with the engine when viewed in a height direction along a height of the work vehicle. The oil separator is connected to the engine via a blow-by-gas discharge pipe to catch a liquid component in blow-by-gas from the engine. The oil separator is provided between the engine and the particulate filter to overlap with the particulate filter when viewed in the height direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is an enlarged side view of the engine compartment excluding heat insulating members, part of an inlet pipe, a turbocharger, an exhaust pipe, a particulate remover, and the like.

FIG. 5 is an enlarged plan view of the engine compartment excluding the heat insulating members, part of the inlet pipe, the turbocharger, part of the exhaust pipe, the particulate remover, and the like.

DESCRIPTION OF THE EMBODIMENTS

Figure 1:
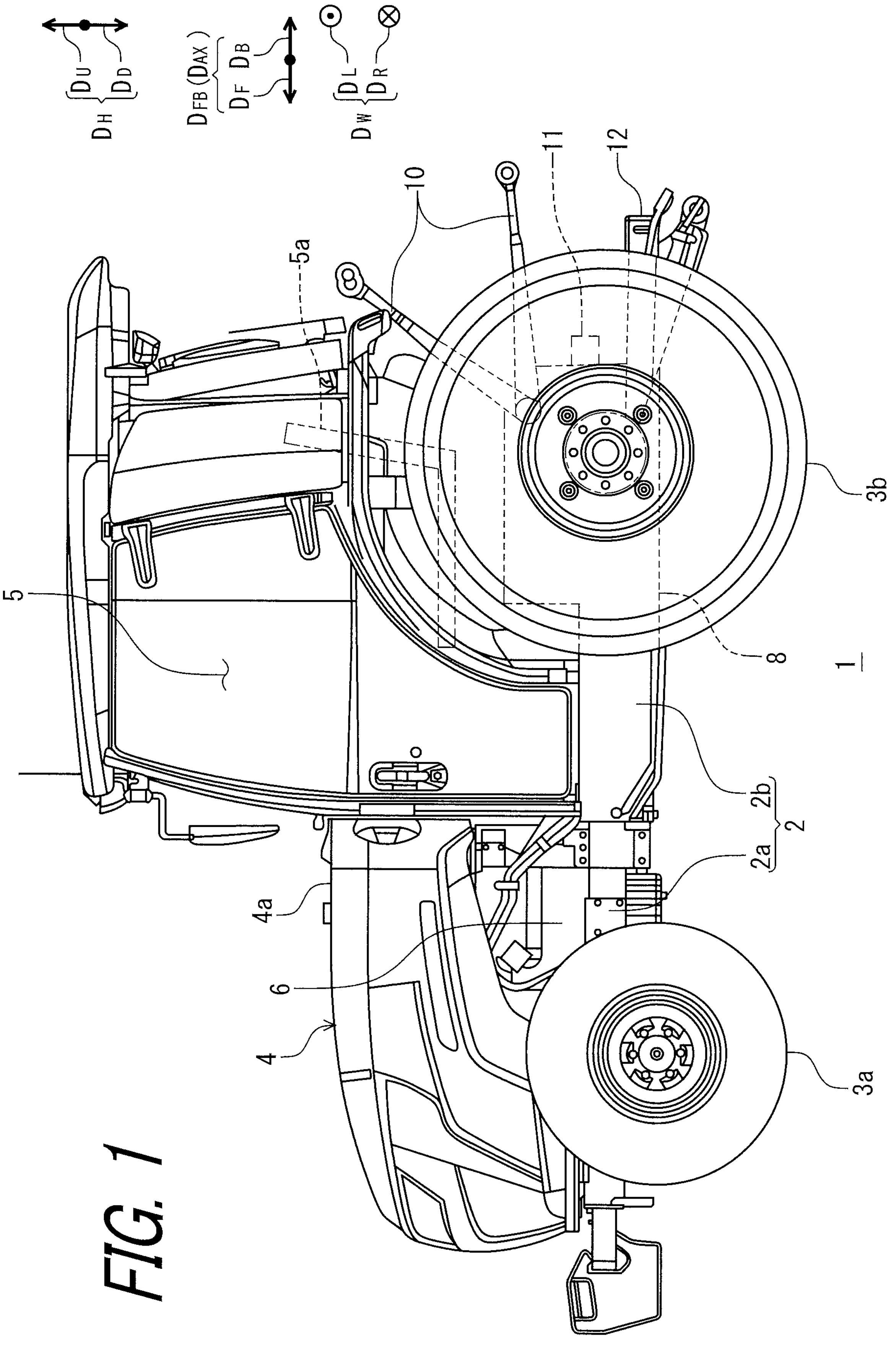
FIG. 1 is a side view of a work vehicle according to an embodiment.

The embodiments will now be described with reference to the accompanying drawings, wherein like reference numerals designate corresponding or identical elements throughout the various drawings.

FIG. 1 is a side view of a work vehicle 1 according to the embodiment. Examples of the work vehicle 1 include an agricultural tractor. The work vehicle 1 includes a vehicle body frame 2, traveling wheels 3*a* and 3*b*, an engine compartment 4, and a driver's cab 5. The work vehicle 1 is preferably a four-wheel drive vehicle configured to rotary drive the four traveling wheels 3*a* and 3*b* to travel.

The embodiment in the present application refers to a forward direction $D_F$ and a backward direction $D_B$ respectively indicating a forward direction and a backward direction viewed from an operator seated on a driver's seat 5*a* provided in the driver's cab 5. An anteroposterior direction $D_{FB}$ has a concept generally indicating the forward direction $D_F$ and the backward direction $D_B$. A leftward direction $D_L$, a rightward direction $D_R$, and a lateral direction $D_W$ indicate a leftward direction, a rightward direction, and a lateral direction viewed from the operator, respectively. An upward direction $D_U$ and a downward direction $D_D$ indicate an upward direction and a downward direction viewed from the operator, respectively. A height direction $D_H$ has a concept generally indicating the upward direction $D_u$ and the downward direction $D_D$. Assume that anteroposterior, transverse (lateral), and height directions of the work vehicle 1 match the anteroposterior, transverse (lateral), and height directions viewed from the operator, respectively.

The vehicle body frame 2 includes a front frame 2*a* and a rear frame 2*b*. The front frame 2*a* is provided with the engine compartment 4. The engine compartment 4 is defined by a cover 4*a*. The cover 4*a* covers at least part of an engine 6 and various devices, which will be described later and are connected to the engine 6. The engine 6 is supported by the front frame 2*a*. The engine 6 is preferably a water-cooled vertical diesel engine including a common rail system (not depicted).

The rear frame 2*b* is provided with the driver's cab 5 and a transmission case 8. The transmission case 8 accommodates a travel gearbox configured to transmit drive power from the engine 6 to the traveling wheels 3*a* and 3*b*, and the like. The transmission case 8 further accommodates a work device gearbox configured to distribute motive power from the engine 6 to a work device (not depicted) separately from the traveling wheels 3*a* and 3*b*, a clutch, and the like. The work device gearbox, the clutch, and the like constitute a motive power transmission system to be called a work transmission system.

The work vehicle 1 further includes a pair of lift arms 10, a PTO shaft 11, and a traction device 12. The lift arms 10 are provided respectively on right and left sides of the work vehicle 1 one by one. The lift arms 10 are each configured to swing upward and downward along with operation of a hydraulic lift cylinder included in the work transmission system. The PTO shaft 11 functions as an output shaft for motive power of the work transmission system. The pair of lift arms 10 are coupled to a link mechanism (not depicted), and the PTO shaft 11 is connected to a transmission shaft for transmission of motive power to a work device (not depicted) like a rotary tillage device coupled to the link mechanism. The traction device 12 includes a convey carrier (not depicted) coupled to a rear end of the work vehicle 1 for conveyance.

<Internal Configuration of Engine Compartment>

Figure 2:
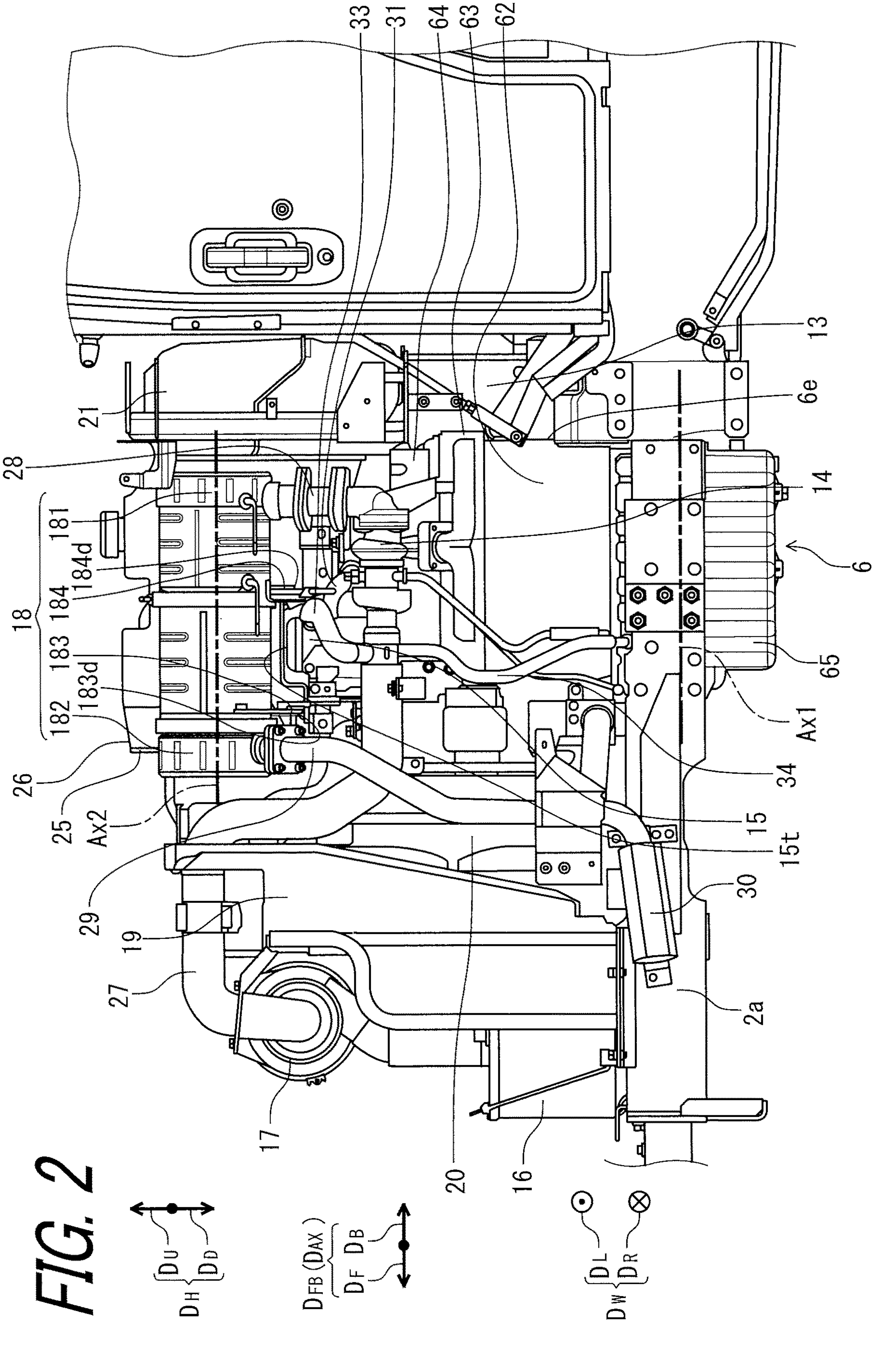
FIG. 2 is an enlarged side view of an engine compartment.
Figure 3:
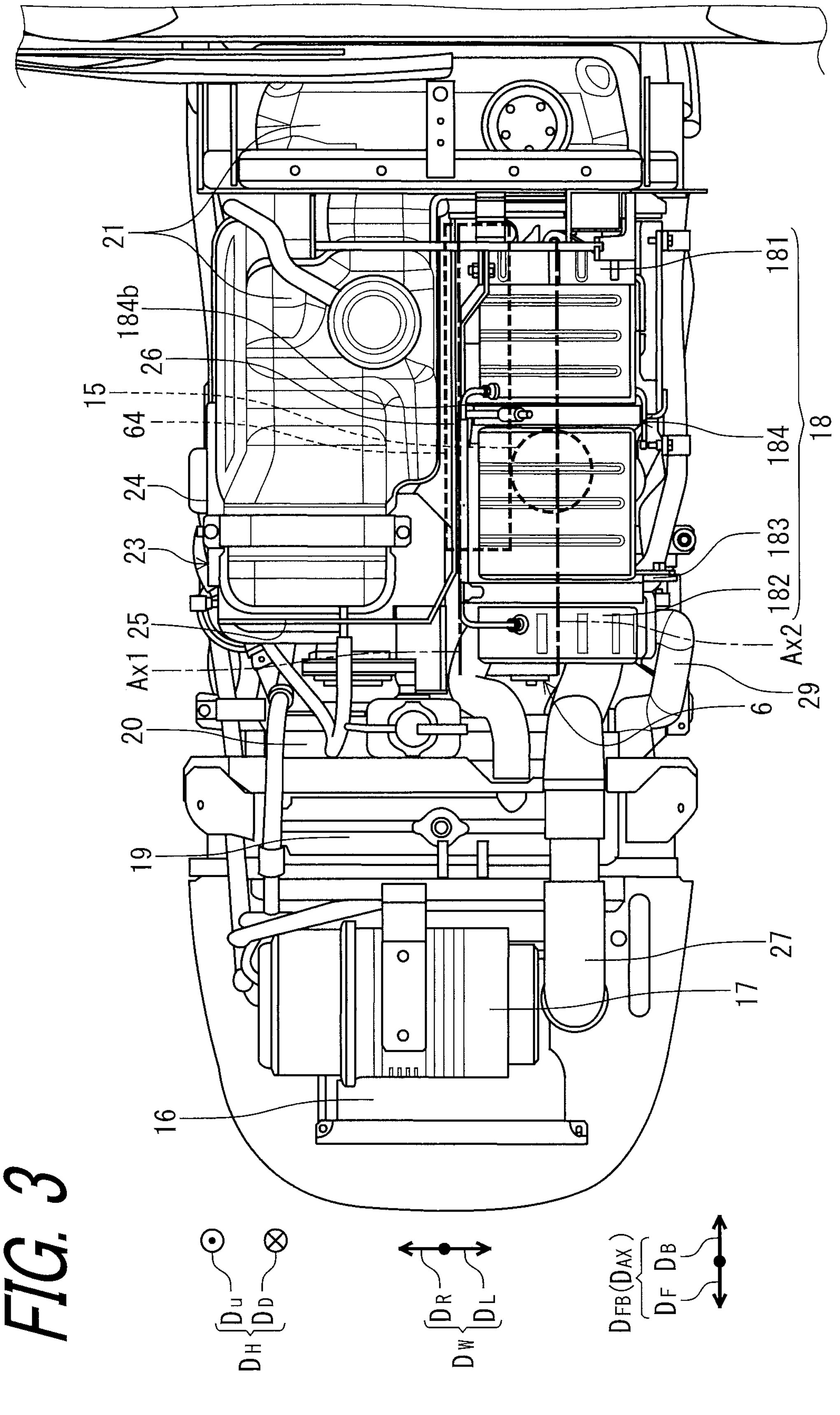
FIG. 3 is an enlarged plan view of the engine compartment.

FIG. 2 is an enlarged side view of an interior of the engine compartment 4. FIG. 3 is an enlarged plan view of the interior of the engine compartment 4. For easier description, FIGS. 2 and 3 exclude the cover 4*a* and part of constituents provided outside the engine compartment 4.

The work vehicle 1 includes the engine 6, a battery 16, an air cleaner 17, a particulate remover 18 (a particulate filter 18), a radiator 19, a cooling fan 20, and a fuel tank 21. The engine compartment 4 is provided with the engine 6, the battery 16, the air cleaner 17, the particulate remover 18, the radiator 19, the cooling fan 20, the fuel tank 21, and the like. The engine 6 is disposed below a rear half of the engine compartment 4 and has a crank axis $A_{X1}$ extending in the anteroposterior direction $D_{FB}$ of the work vehicle 1. The battery 16 and the air cleaner 17 are disposed at a front end of the engine compartment 4. The particulate remover 18 has an orientation having a longitudinal direction matching the anteroposterior direction $D_{FB}$ and is disposed in a space above a left half of the engine 6 disposed in the rear half of the engine compartment 4. The radiator 19 and the cooling fan 20 are disposed between the engine 6 and the battery 16 as well as the air cleaner 17. The fuel tank 21 has a substantially L shape when viewed in the height direction $D_H$, and is positioned in a space above a partition wall 13 having a narrow front portion positioned above $D_U$ a right half of the engine 6 and a wide rear portion positioned behind a rear end 6*e* of the engine 6. The fuel tank 21 is accordingly disposed above $D_U$ the engine 6. The engine 6 is disposed below $D_D$ the fuel tank 21.

As depicted in FIGS. 2 and 3, the engine 6 is provided with a support member (not depicted) standing at an upper front end of the engine 6. There is provided, from an upper end of the support member to an upper end of the partition wall 13, a tank support 23 receiving and supporting the fuel tank 21 from below. The tank support 23 is provided with a bottom shield plate 24 having a substantially L shape when viewed in the height direction $D_H$ and partitioning between the engine 6 and the fuel tank 21, from the support member to the partition wall 13, a front shield plate 25 facing a front end surface of the fuel tank 21, and a lateral shield plate 26 having an L shape in planar view and partitioning between the particulate remover 18 and the fuel tank 21. The bottom shield plate 24, the front shield plate 25, and the lateral shield plate 26 are each constituted by a heat insulating member. The fuel tank 21 is thus surrounded with the bottom shield plate 24, the front shield plate 25, the lateral shield plate 26, and the cover 4*a*, and is disposed in a space insulated from heat emitted from the engine 6 and the particulate remover 18.

With reference to FIG. 2, the work vehicle 1 further includes a turbocharger 14, an inlet pipe 27, and an exhaust pipe 28. The turbocharger 14 is provided to the left of the engine 6 and supercharges inlet air by means of exhaust gas. The turbocharger 14 has an air inlet directed in the forward direction $D_F$ of the work vehicle 1, and an air outlet directed in the backward direction $D_B$ of the work vehicle 1. The inlet pipe 27 is provided between the turbocharger 14 and the air cleaner 17, is connected to the air cleaner 17, and extends toward the engine 6. The turbocharger 14 connects the inlet pipe 27 and the engine 6. The exhaust pipe 28 is provided between the turbocharger 14 and the particulate remover 18 to connect the turbocharger 14 and the particulate remover 18.

<Particulate Remover>

The particulate remover 18 is preferably constituted by a diesel particulate filter. The particulate remover 18 is connected to the engine 6 and collects particulate matter (soot etc.) contained in exhaust gas from the engine 6. The particulate remover 18 may further include a catalytic oxidation device or a selective catalytic reduction device. The particulate remover 18 has a substantially tubular shape provided with a center axis $A_{X2}$. An axial direction $D_{AX}$ along the center axis $A_{X2}$ is generally perpendicular to the height direction $D_H$ and generally matches the anteroposterior direction $D_{FB}$ of the work vehicle 1. Furthermore, the center axis $A_{X2}$ is generally parallel to the crank axis $A_{X1}$.

The particulate remover 18 includes a first end 181, a second end 182, a first flange 183, and a second flange 184. The first end 181 is attached to the exhaust pipe 28. The second end 182 corresponds to an opposite end of the first end 181 in the axial direction $D_{AX}$. The second end 182 is connected to an extended exhaust pipe 29. The extended exhaust pipe 29 extends from the second end 182 of the particulate remover 18 toward a position to the left of the front frame 2*a*. The extended exhaust pipe 29 has an extended end inserted to a rear end of an exhaust gas mixing pipe 30 having a hexagonal sectional shape, coupled by means of a bolt to a left side part of the front frame 2*a* and having an orientation extending forward and downward, with a gap provided between an inner peripheral surface of the rear end and an outer peripheral surface of the extended end. Such disposition achieves an ejector effect when exhaust gas from the engine 6 flows from the extended exhaust pipe 29 to the exhaust gas mixing pipe 30. The first flange 183 is provided at the second end 182 and radially extends with respect to the center axis $A_{X2}$. The second flange 184 is provided at a substantially center between the first end 181 and the second end 182, and radially extends with respect to the center axis $A_{X2}$.

As depicted in FIG. 3, the particulate remover 18 overlaps with the engine 6 when viewed in the height direction $D_H$ along the vertical side of the work vehicle 1. More specifically, the engine 6 includes a cylinder head cover 64, and the particulate remover 18 overlaps with the cylinder head cover 64 when viewed in the height direction $D_H$. The particulate remover 18 is disposed adjacent to the fuel tank 21 in the lateral direction $D_W$ substantially perpendicular to the height direction $D_H$ and the axial direction $D_{AX}$. Specifically, the particulate remover 18 is disposed adjacent to the fuel tank 21 in the rightward direction $D_R$. In other words, the fuel tank 21 is disposed adjacent to the particulate remover 18 in the lateral direction $D_W$. The fuel tank 21 is disposed adjacent to the particulate remover 18 in the leftward direction $D_L$.

<Oil Separator>

The work vehicle 1 further includes an oil separator 15 configured to catch a liquid component in blow-by-gas from the engine 6. As depicted in FIG. 2, the oil separator 15 is disposed between the engine 6 and the particulate remover 18. The oil separator 15 is positioned between the first flange 183 and the second flange 184 in the axial direction $D_{AX}$. The oil separator 15 has an upper end 15*t* positioned above $D_U$ a lower end 183*d* of the first flange 183 and above $D_U$ a lower end 184*d* of the second flange 184. As depicted in FIG. 3, the oil separator 15 overlaps with the particulate remover 18 when viewed in the height direction $D_H$.

Figure 4:
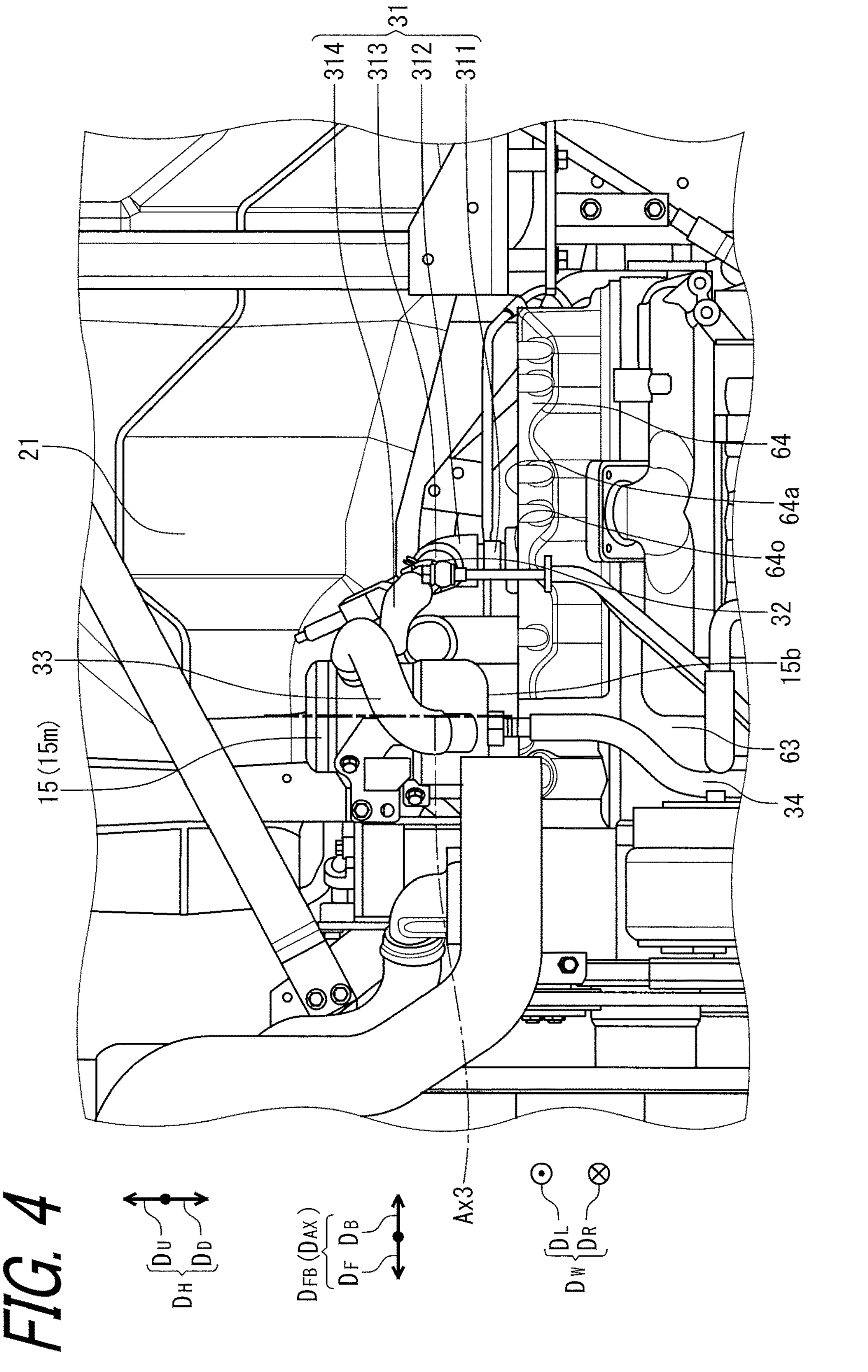

FIG. 4 is an enlarged side view of the engine compartment 4 around the oil separator 15, excluding the heat insulating members 24 to 26, part of the inlet pipe 27, the turbocharger 14, the exhaust pipe 28, the particulate remover 18, and the like. With reference to FIG. 4, the oil separator 15 has a main body 15*m* having a substantially tubular shape and provided with a center axis $A_{X3}$ extending in the height direction $D_H$. The oil separator 15 overlaps with the fuel tank 21 when viewed in the lateral direction $D_W$. As apparent from FIGS. 2 and 4, the heat insulating member 26 (lateral shield plate 26) accordingly partitions between the oil separator 15 and the fuel tank 21. Furthermore, the oil separator 15 is positioned above $D_U$ the cylinder head cover 64 in the height direction $D_H$. More specifically, the oil separator 15 has a lower end 15*b* positioned above $D_U$ an upper end 64*a* of the cylinder head cover 64 in the height direction $D_H$.

Figure 5:
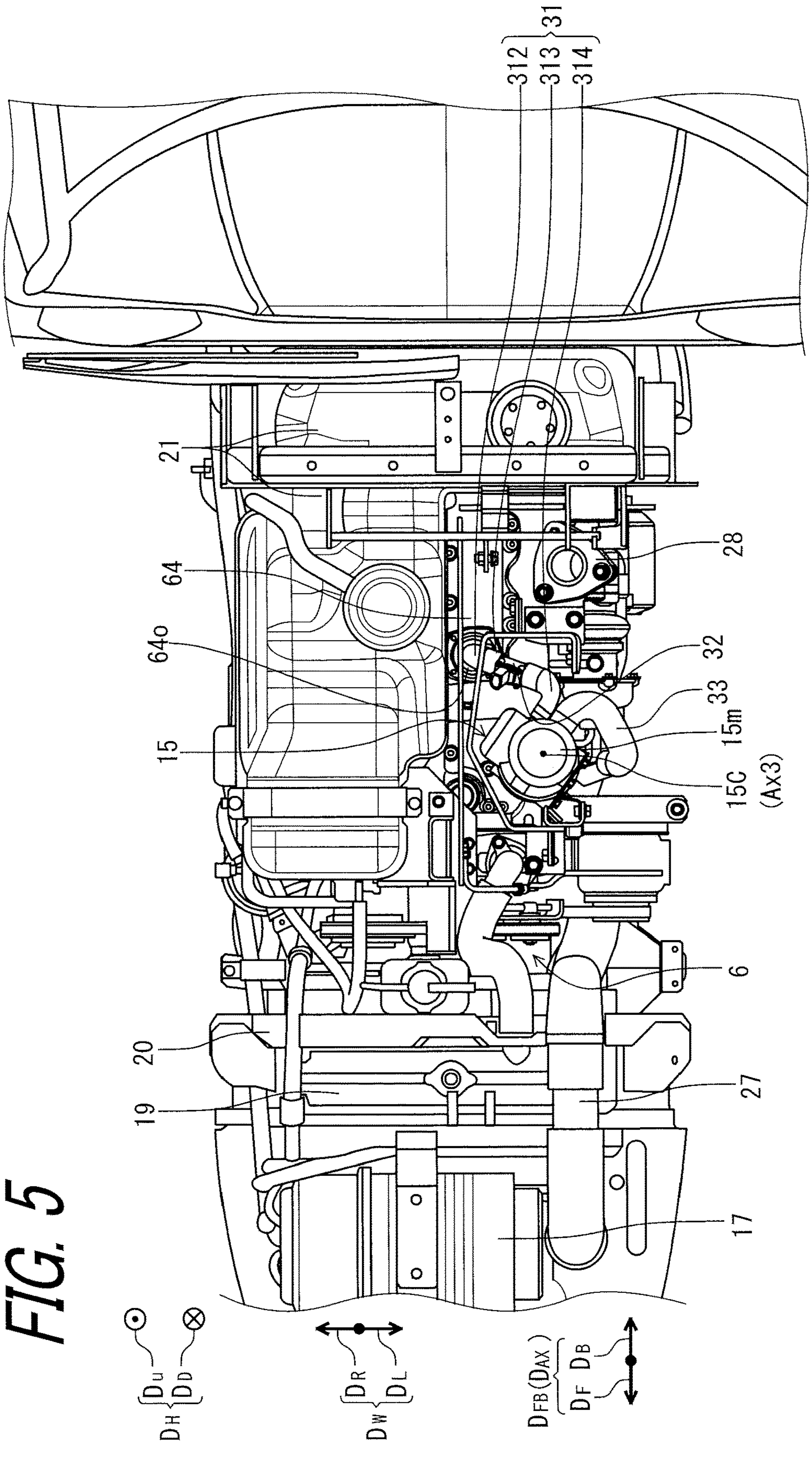

FIG. 5 is an enlarged plan view of the engine compartment 4 around the oil separator 15, excluding the heat insulating members 24 to 26, part of the inlet pipe 27, the turbocharger 14, the exhaust pipe 28, the particulate remover 18, and the like. With reference to FIG. 5, the cylinder head cover 64 is positioned between a center 15C of the oil separator 15 and the fuel tank 21 when viewed in the height direction $D_H$. The center 15C of the oil separator 15 indicates the center axis $A_{X3}$ of the main body 15*m* of the oil separator 15. With reference to FIGS. 2, 4, and 5, the oil separator 15 is connected to the engine 6 via a blow-by-gas discharge pipe 31. Specifically, the work vehicle 1 further includes the blow-by-gas discharge pipe 31 connecting the cylinder head cover 64 and the oil separator 15. With reference to FIGS. 4 and 5, the blow-by-gas discharge pipe 31 includes an upright part 311, a first bent part 312, a linear part 313, and a second bent part 314. The upright part 311 is connected to the cylinder head cover 64 and extends in the height direction $D_H$. The first bent part 312 is connected to the upright part 311 and is bent toward the oil separator 15. The linear part 313 is connected to the first bent part 312 and extends diagonally upward. The second bent part 314 is connected to the linear part 313, is bent toward the oil separator 15, and is connected to the oil separator 15. The linear part 313 is provided with a heater 32. Specifically, the work vehicle 1 further includes the heater 32 provided at the linear part 313. The heater 32 is exemplarily constituted by a positive temperature coefficient (PCT) heater. The PCT heater generates heat by causing electricity sent from a power source like the battery 16 to pass through electric resistance. The PCT heater has a resistance value increased when temperature reaches or exceeds a predetermined level, and is likely to have a smaller current flow. The PCT heater thus inhibits excessive temperature rise. The heater 32 heats blow-by-gas in the blow-by-gas discharge pipe 31 by means of the heat thus generated.

With reference to FIG. 2, the work vehicle 1 further includes an additional blow-by-gas discharge pipe 33 connecting the oil separator 15 and the inlet pipe 27. The additional blow-by-gas discharge pipe 33 is connected to the inlet pipe 27 between the air cleaner 17 and the turbocharger 14. Blow-by-gas processed by the oil separator 15 is thus sent to the inlet pipe 27 via the additional blow-by-gas discharge pipe 33. With reference to FIGS. 4 and 5, the additional blow-by-gas discharge pipe 33 is bent to be away from the blow-by-gas discharge pipe 31 and extends toward the inlet pipe 27. The additional blow-by-gas discharge pipe 33 is provided with no heater, unlike the blow-by-gas discharge pipe 31.

With reference to FIG. 4, the work vehicle 1 further includes an oil drain pipe 34 connected to the lower end 15*b* of the oil separator 15 in the height direction $D_H$. More specifically, as depicted in FIG. 2, the engine 6 includes an oil pan 65, and the oil drain pipe 34 connects the lower end 15*b* of the oil separator 15 and the oil pan 65. The oil drain pipe 34 is provided with no heater, unlike the blow-by-gas discharge pipe 31.

<Flow of Blow-by-Gas>

Figure 6:
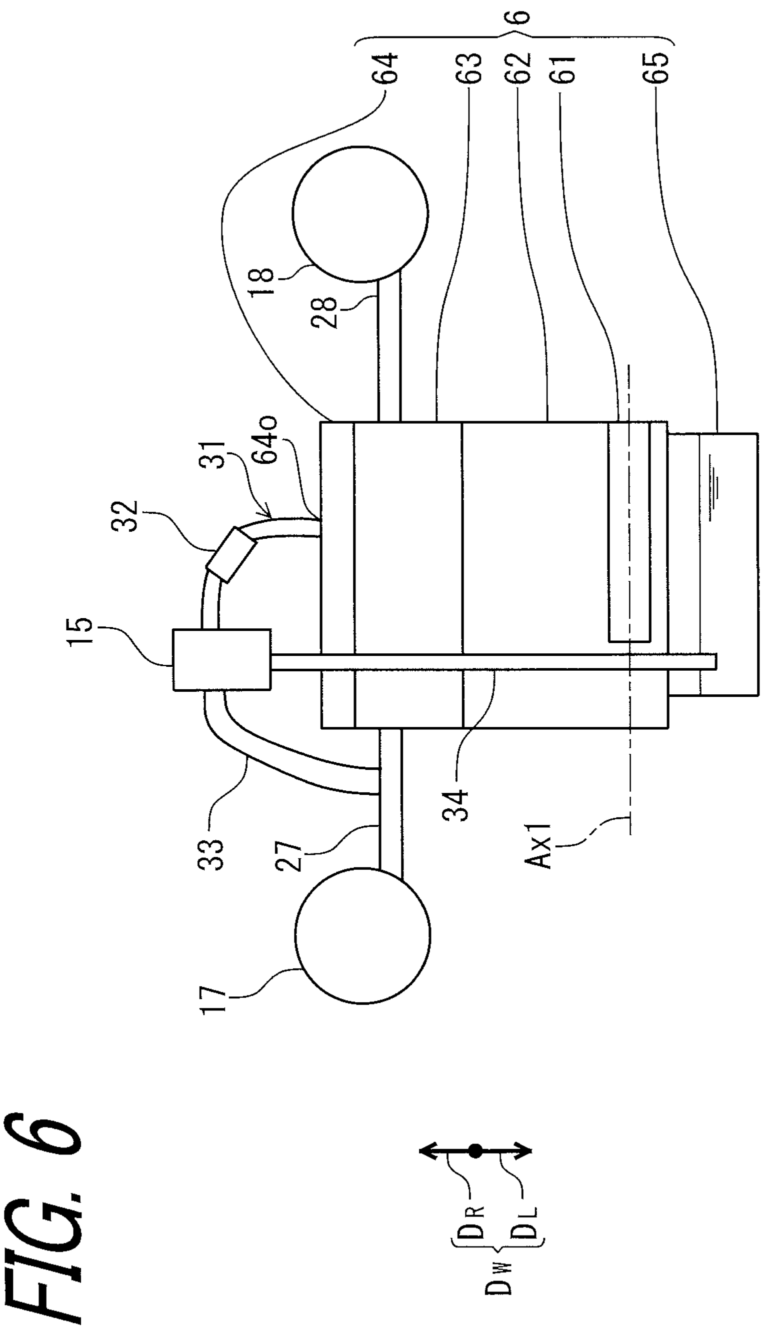
FIG. 6 is an explanatory schematic view on a flow of blow-by-gas in an engine according to an embodiment of the present invention.

FIG. 6 is an explanatory schematic view on a flow of blow-by-gas in the engine 6 according to the embodiment of the present invention. As depicted in FIG. 6, the engine 6 includes a crank shaft 61, a cylinder block 62, a cylinder head 63, the cylinder head cover 64, and the oil pan 65. The crank shaft 61 has a center provided with the crank axis $A_{X1}$. The crank shaft 61 extends substantially perpendicularly to the height direction $D_H$. The crank shaft 61 extends generally in parallel with the axial direction $D_{AX}$. The cylinder block 62 accommodates the crank shaft 61. The cylinder block 62 includes a so-called crank case. The cylinder head 63 is provided above $D_U$ the cylinder block 62 in the height direction $D_H$. The cylinder head 63 is connected to the inlet pipe 27 and the exhaust pipe 28. The cylinder head cover 64 is provided above $D_U$ the cylinder head 63 in the height direction $D_H$ and has a blow-by-gas outlet port 64*o* provided in an outer surface 64*a* (see FIG. 4) opposite to the cylinder head 63 in the height direction $D_H$. The blow-by-gas discharge pipe 31, the oil separator 15, and the additional blow-by-gas discharge pipe 33 are provided, in the mentioned order, between the cylinder head cover 64 and the inlet pipe 27. The oil pan 65 is provided below $D_D$ the cylinder block 62 in the height direction $D_H$.

The heater 32 heats blow-by-gas led out of the cylinder head cover 64 of the engine 6 to prevent moisture contained in the blow-by-gas from freezing and inhibit blockade of the blow-by-gas discharge pipe 31 upon cold start and during subsequent warming up of the engine 6. The oil separator 15 is disposed adjacent to the cylinder head cover 64, and the blow-by-gas discharge pipe 31 is short in length and is disposed adjacent to the engine 6 and the particulate remover 18, so that blow-by-gas is warmed with heat generated by the engine 6 and the particulate remover 18. Accordingly, there may be provided only one heater 32.

Blow-by-gas processed by the oil separator 15 to have no liquid component is sent to the inlet pipe 27 via the additional blow-by-gas discharge pipe 33. The oil separator 15 is disposed adjacent to the inlet pipe 27, so that the additional blow-by-gas discharge pipe 33 is short in length and is disposed adjacent to the engine 6 and the particulate remover 18. Blow-by-gas in the additional blow-by-gas discharge pipe 33 is thus warmed with heat generated by the engine 6 and the particulate remover 18. The additional blow-by-gas discharge pipe 33 is thus not necessarily provided with any heater.

The oil separator 15 sends the liquid component (particularly an oil component to be hereinafter called drain oil) contained in blow-by-gas to the oil pan 65 via the oil drain pipe 34. As depicted in FIG. 2 and the like, the oil drain pipe 34 extends along a side surface of the engine 6. The oil drain pipe 34 is thus warmed with heat generated by the engine 6.

The drain oil is less likely to freeze even in the case where the oil drain pipe 34 is provided with no heater.

<Bracket Mounting Oil Separator>

Figure 7:
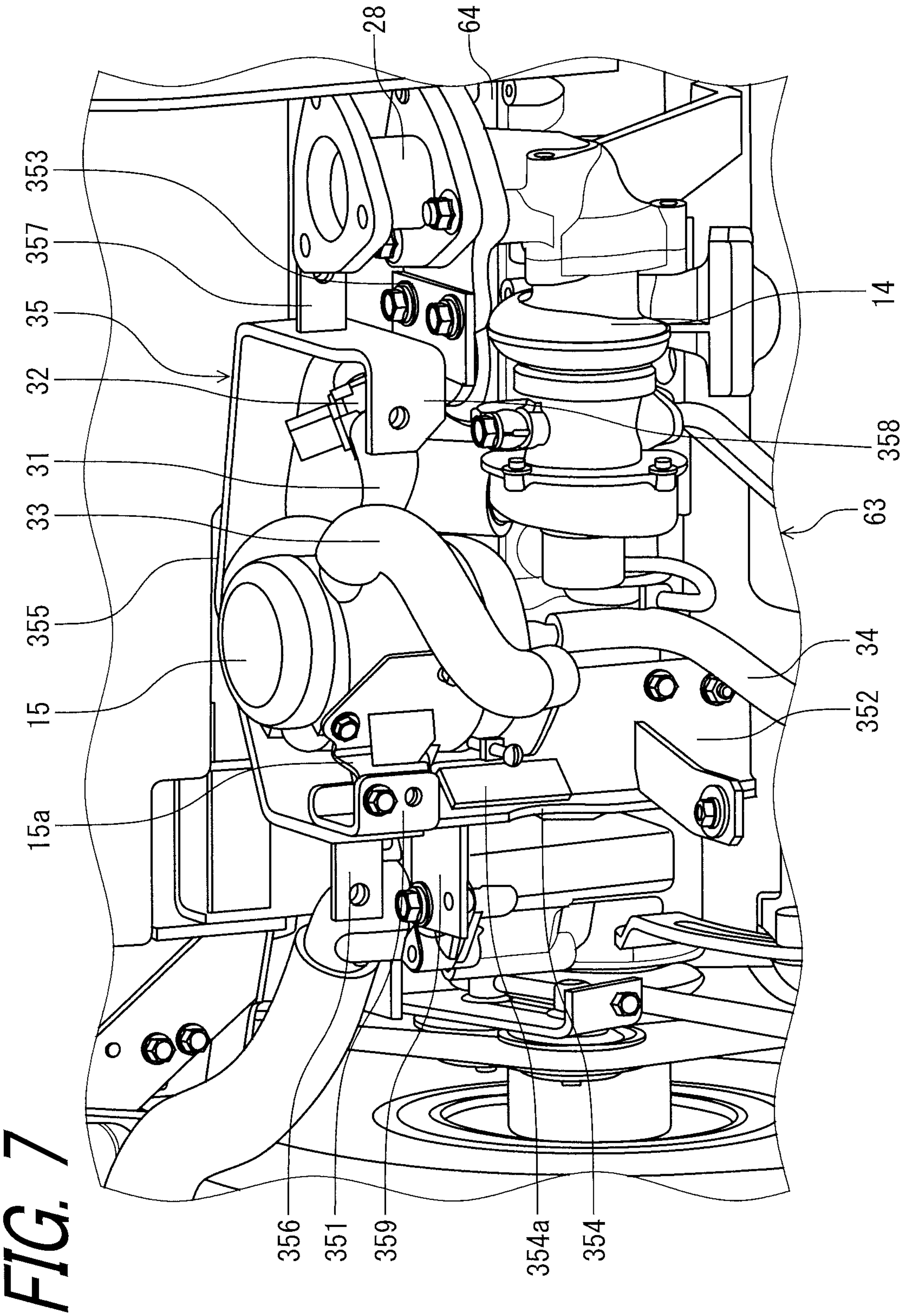
FIG. 7 is an enlarged perspective view of a portion around a first bracket.
Figure 8:
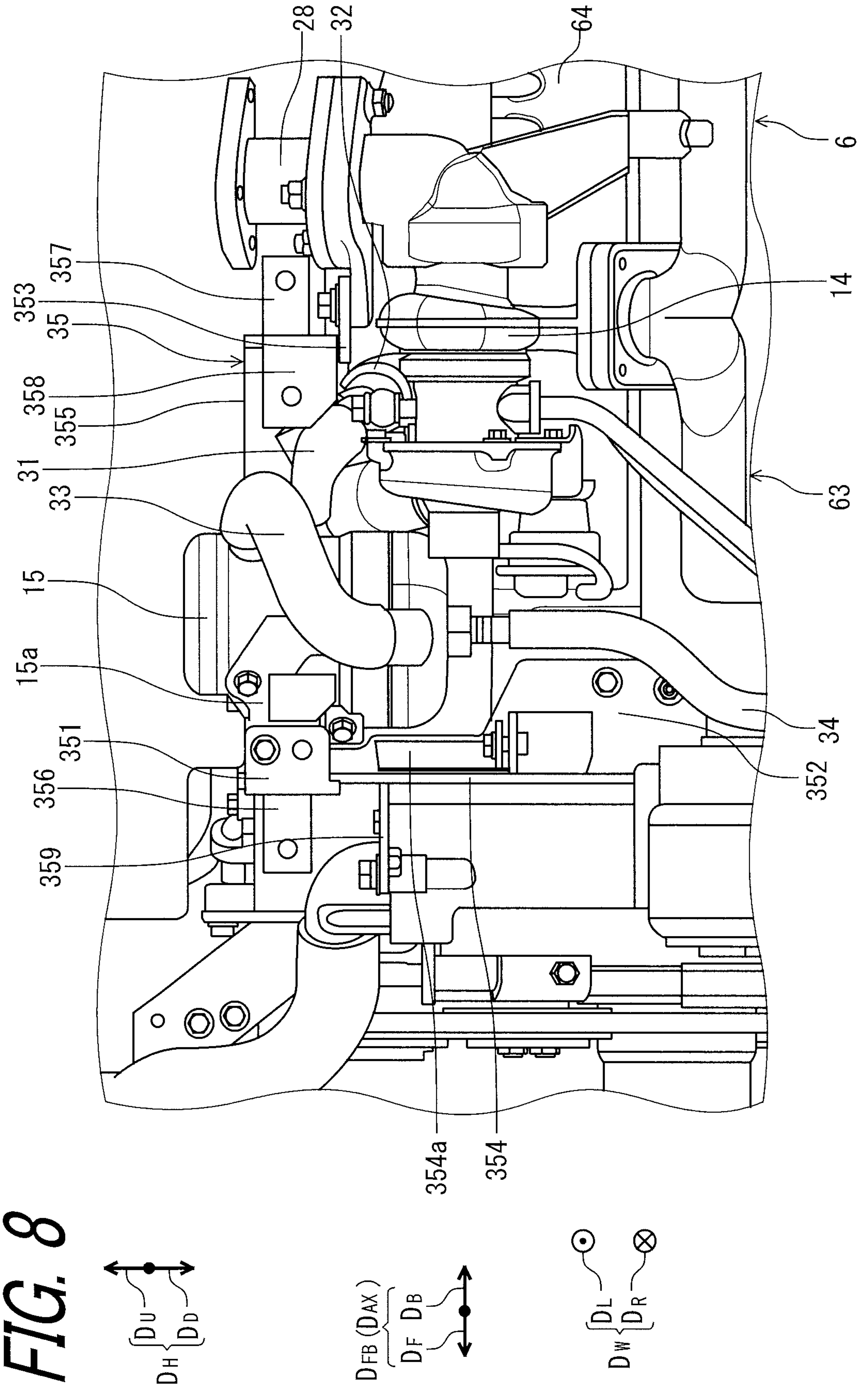
FIG. 8 is an enlarged side view of the portion around the first bracket.
Figure 9:
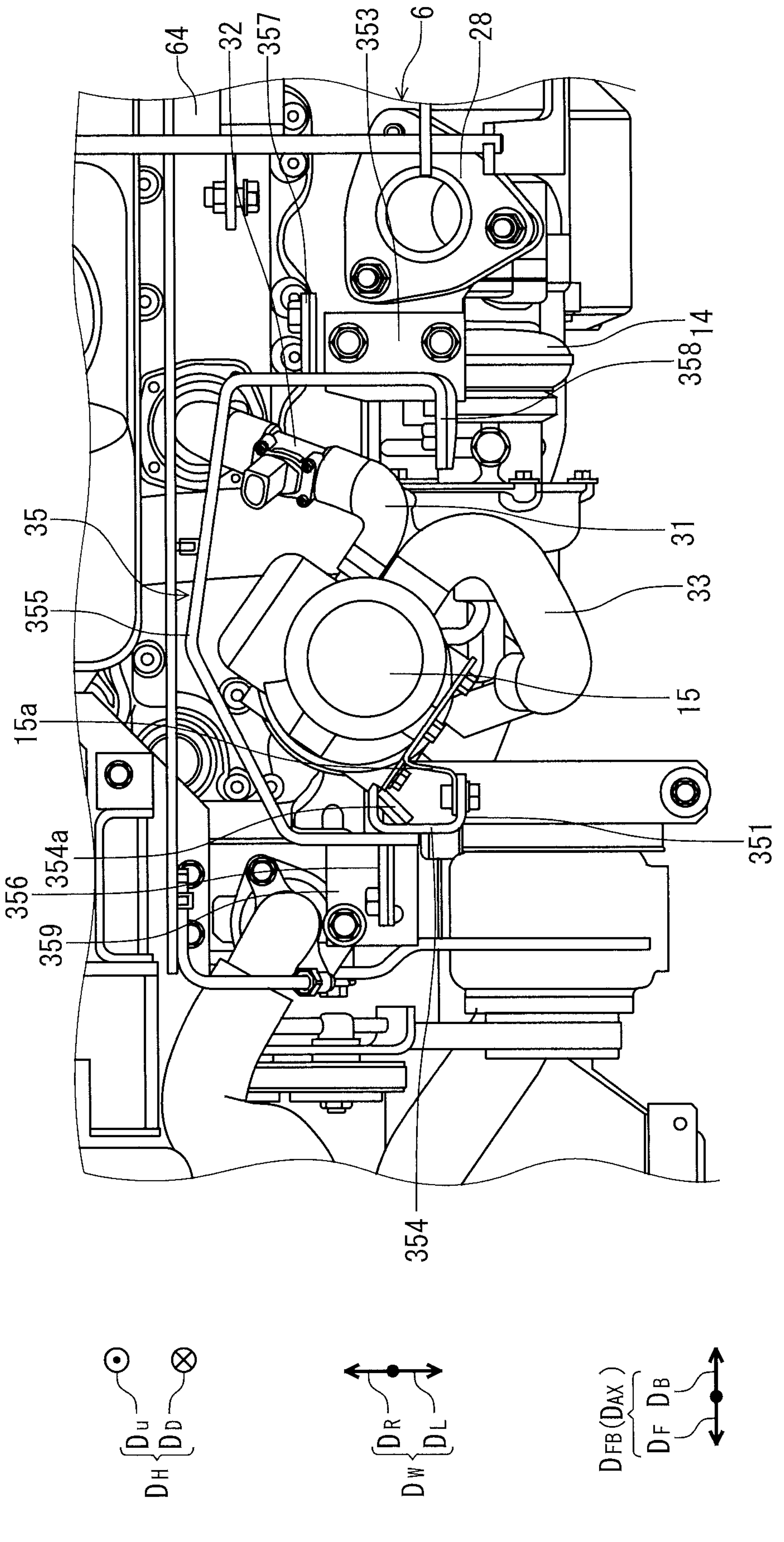
FIG. 9 is an enlarged plan view of the portion around the first bracket.

The work vehicle 1 further includes a first bracket 35 fixing the oil separator 15 to the engine 6. FIG. 7 is an enlarged perspective view of a portion around the oil separator 15 and the first bracket 35. FIG. 8 is an enlarged side view of the portion around the oil separator 15 and the first bracket 35 depicted in FIG. 7. FIG. 9 is an enlarged plan view of the portion around the oil separator 15 and the first bracket 35 depicted in FIG. 7. For easier description, FIGS. 7 to 9 do not depict the inlet pipe 27, the particulate remover 18, or the like.

With reference to FIGS. 7 to 9, the first bracket 35 includes an oil separator attachment part 351, an engine connecting part 352, an exhaust pipe connecting part 353, a first beam 354, and a second beam 355. The oil separator 15 is attached to the oil separator attachment part 351. The oil separator 15 preferably includes a mounting fitting 15*a* having a through hole for a bolt. The oil separator attachment part 351 has a through hole corresponding to the mounting fitting 15*a*, and the oil separator 15 is attached to the oil separator attachment part 351 when the mounting fitting 15*a* and the oil separator attachment part 351 are fastened to each other by means of a bolt and a nut.

The engine connecting part 352 is connected to the engine 6. The engine connecting part 352 is positioned below $D_D$ the oil separator attachment part 351. The engine connecting part 352 has a through hole for a bolt, and is screwed to the cylinder head 63 of the engine 6 by means of the bolt. The exhaust pipe connecting part 353 is connected to the exhaust pipe 28. The exhaust pipe connecting part 353 is positioned behind $D_B$ the oil separator attachment part 351. More specifically, the exhaust pipe connecting part 353 opposes the oil separator attachment part 351 in the anteroposterior direction $D_{FB}$, with the oil separator 15 disposed therebetween.

The first beam 354 extends upward $D_U$ in the height direction $D_H$ from the engine connecting part 352 to the oil separator attachment part 351. The first beam 354, the engine connecting part 352, and the oil separator attachment part 351 are formed by bending a single plate member into a U shape. The first beam 354 is provided with a reinforcing rib 354*a* at a corner of a bent part.

The second beam 355 extends generally in the axial direction $D_{AX}$ (the anteroposterior direction $D_{FB}$) from the oil separator attachment part 351 to the exhaust pipe connecting part 353 while bypassing the oil separator 15. The second beam 355 is constituted by a plate member provided separately from and joined by welding to the plate member constituting the first beam 354, the engine connecting part 352, and the oil separator attachment part 351, and a plate member constituting the exhaust pipe connecting part 353. The plate member constituting the second beam 355 may alternatively be provided integrally with either one or both of the plate member constituting the first beam 354, the engine connecting part 352, and the oil separator attachment part 351 and the plate member constituting the exhaust pipe connecting part 353.

The first bracket 35 further includes a first bracket attachment part 356, a second bracket attachment part 357, and a third bracket attachment part 358. There is provided a second bracket 36 to be described later, attached to the first bracket attachment part 356, the second bracket attachment part 357, and the third bracket attachment part 358. The first bracket attachment part 356 is constituted by a plate member attached by welding to a front end of the second beam 355 and has a through hole for a bolt. The second bracket attachment part 357 is constituted by a plate member attached by welding to a rear end of the second beam 355 and has a through hole for a bolt. The third bracket attachment part 358 is formed by bending forward $D_F$ the rear end of the second beam 355, and has a through hole for a bolt. In planar view, the second bracket attachment part 357 is positioned to the right of the exhaust pipe connecting part 353, and the third bracket attachment part 358 is positioned to the left of the exhaust pipe connecting part 353.

The first bracket 35 further includes an additional engine connecting part 359. The additional engine connecting part 359 is constituted by a plate member provided below $D_D$ the first bracket attachment part 356 in the height direction $D_H$ and attached by welding to the front end of the second beam 355, and has a through hole for a bolt. The additional engine connecting part 359 is screwed, by means of the bolt, to a portion adjacent to a thermostat of the engine 6.

<Bracket Mounting Particulate Remover>

Figure 10:
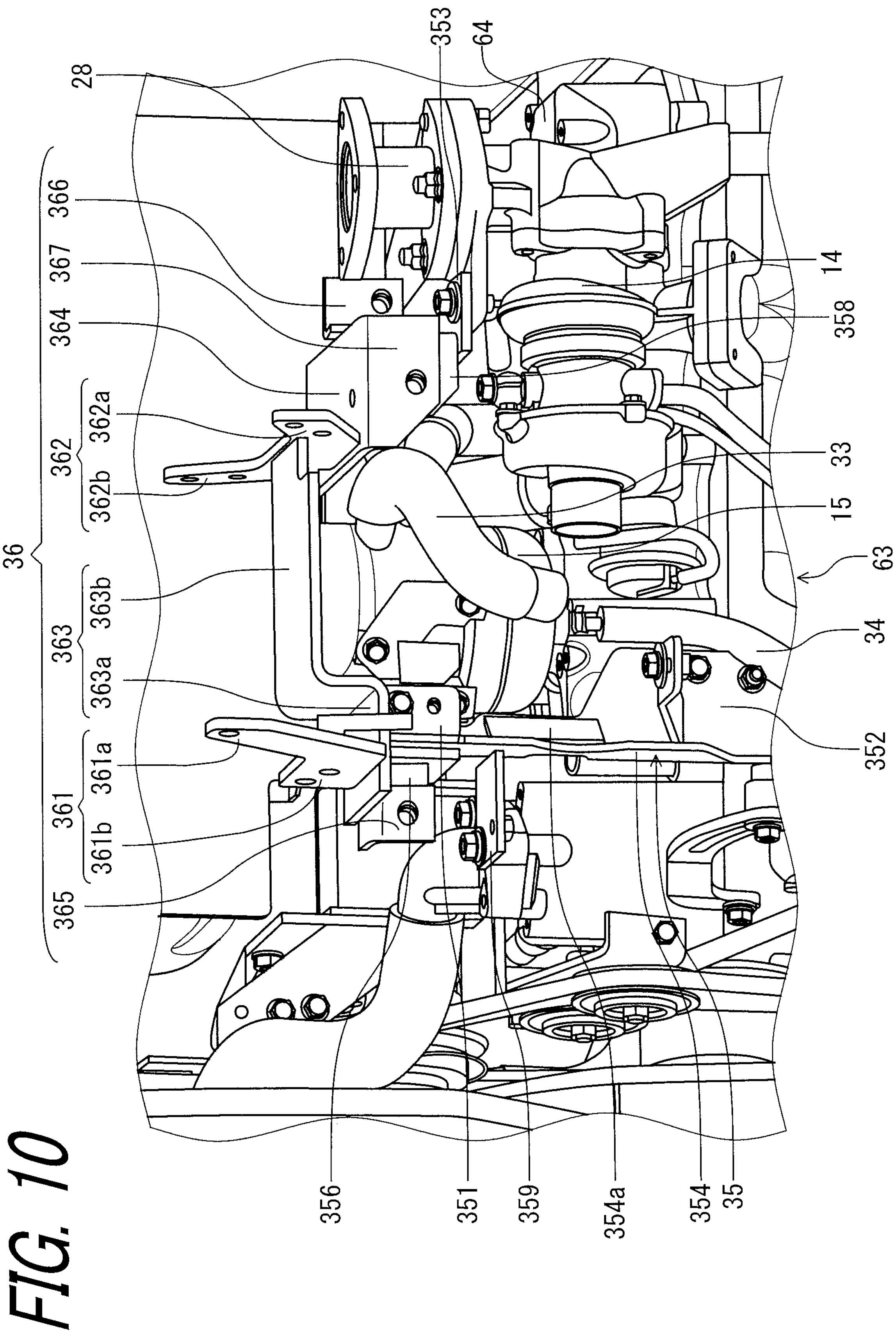
FIG. 10 is an enlarged perspective view of a portion around the first bracket and a second bracket.
Figure 11:
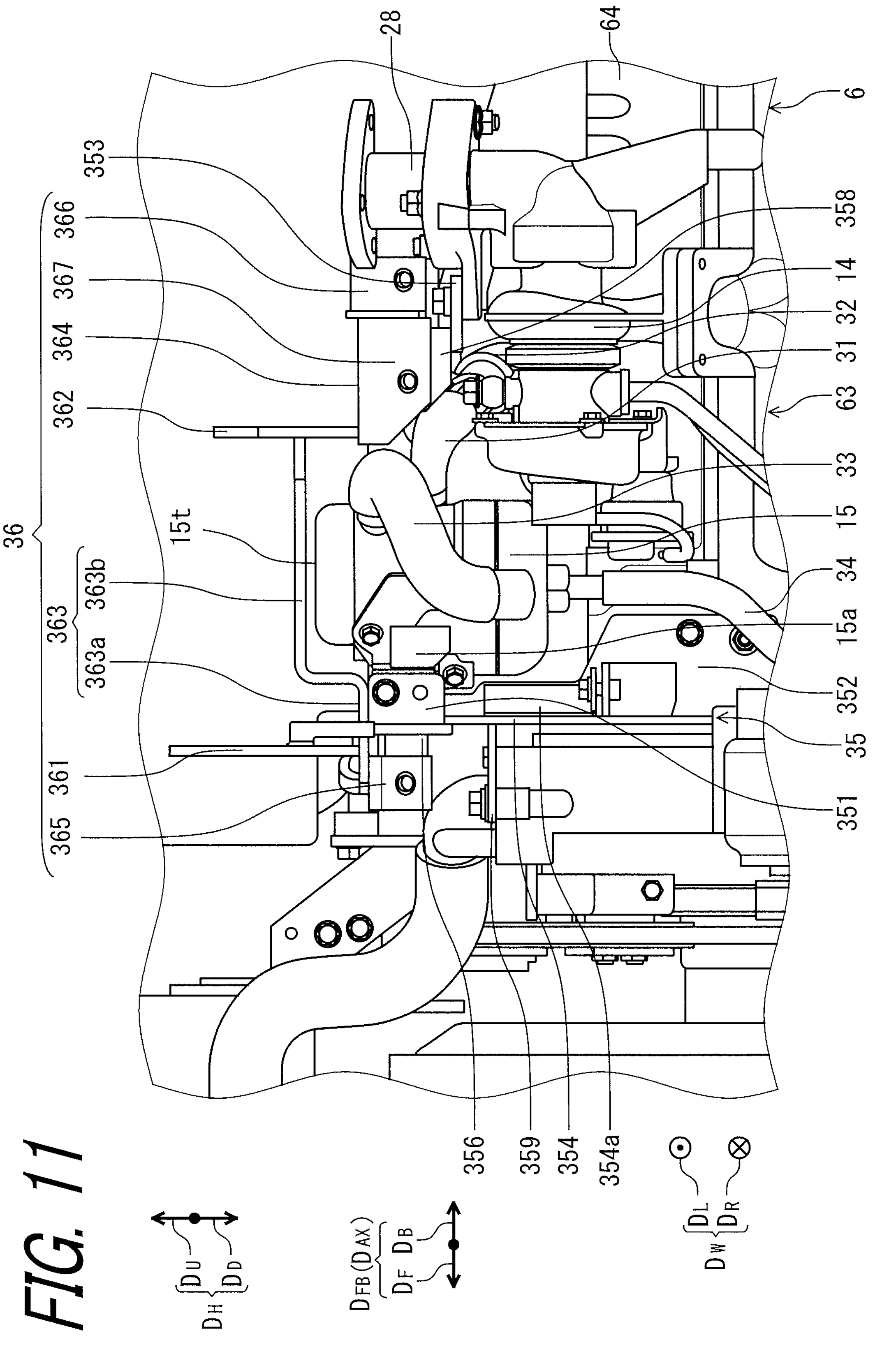
FIG. 11 is an enlarged side view of the portion around the first bracket and the second bracket
Figure 12:
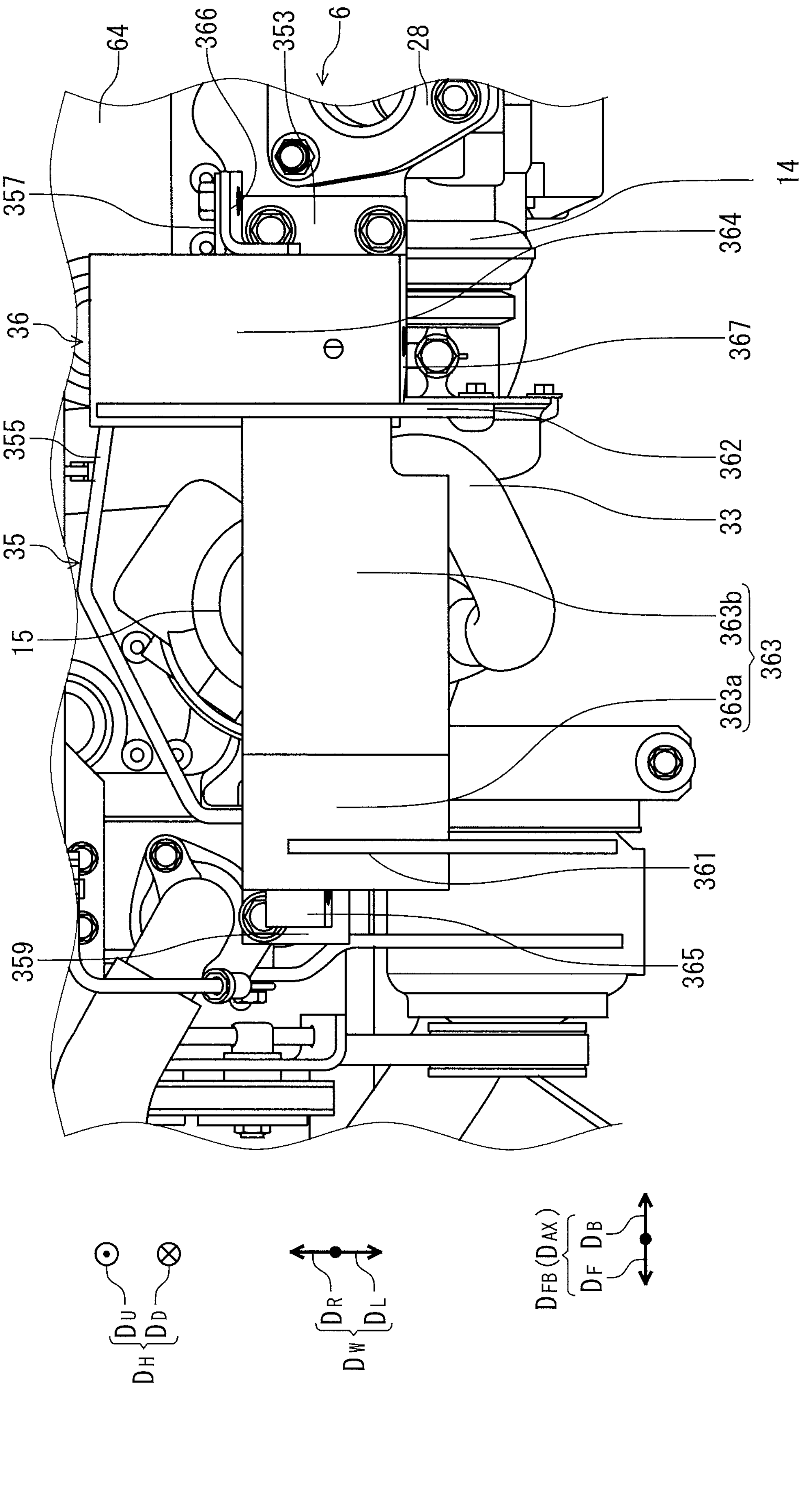
FIG. 12 is an enlarged plan view of the portion around the first bracket and the second bracket.

The work vehicle 1 further includes the second bracket 36 fixing the particulate remover 18 on the first bracket 35. FIG. 10 is an enlarged perspective view of a portion around the first bracket 35 and the second bracket 36. FIG. 11 is an enlarged side view of the portion around the first bracket 35 and the second bracket 36. FIG. 12 is an enlarged plan view of the portion around the first bracket 35 and the second bracket 36. For easier description, FIGS. 10 to 12 do not depict the inlet pipe 27, the particulate remover 18, or the like.

With reference to FIGS. 10 to 12, the second bracket 36 includes a first support part 361, a second support part 362, a first base plate 363, and a second base plate 364. The first support part 361 supports the first flange 183 and extends in the height direction $D_H$. The second support part 362 supports the second flange 184 and extends in the height direction $D_H$. The first base plate 363 is provided on the first beam 354 to support the first support part 361, and is a Z shaped material extending from the first beam 354 to the second support part 362. The second base plate 364 is provided on the second beam 355 between the oil separator 15 and the exhaust pipe 28, and supports the second support part 362. The first base plate 363 includes a base end 363*a* and a tip end 363*b*. As depicted in FIG. 11, the base end 363*a* is connected to the first beam 354, and is positioned below $D_D$ the upper end 15*t* of the oil separator 15 in the height direction $D_H$. The tip end 363*b* is connected to the second support part 362, generally extends in the axial direction $D_{AX}$, and is positioned above $D_U$ the upper end 15*t* of the oil separator 15 in the height direction $D_H$.

The second bracket 36 further includes a fourth bracket attachment part 365, a fifth bracket attachment part 366, and a sixth bracket attachment part 367. The fourth bracket attachment part 365 is attached to the first bracket attachment part 356. The fourth bracket attachment part 365 is constituted by a plate member having an L shape and attached by welding to a front end of the base end 363*a* of the first base plate 363, and has a through hole corresponding to the through hole of the first bracket attachment part 356. The fourth bracket attachment part 365 is fastened to the first bracket attachment part 356 by means of a bolt and a nut.

The fifth bracket attachment part 366 is attached to the second bracket attachment part 357. The fifth bracket attachment part 366 is constituted by a plate member having an L shape and attached by welding to a rear end of the second base plate 364, and has a through hole corresponding to the through hole of the second bracket attachment part 357. The fifth bracket attachment part 366 is fastened to the second bracket attachment part 357 by means of a bolt and a nut.

The sixth bracket attachment part 367 is attached to the third bracket attachment part 358. The sixth bracket attachment part 367 is formed by bending downward $D_D$ a left end of the second base plate 364, and has a through hole corresponding to the through hole of the third bracket attachment part 358. The sixth bracket attachment part 367 is fastened to the third bracket attachment part 358 by means of a bolt and a nut. In planar view, the fifth bracket attachment part 366 is positioned to the right of the exhaust pipe connecting part 353, and the sixth bracket attachment part 367 is positioned to the left of the exhaust pipe connecting part 353.

Figure 13:
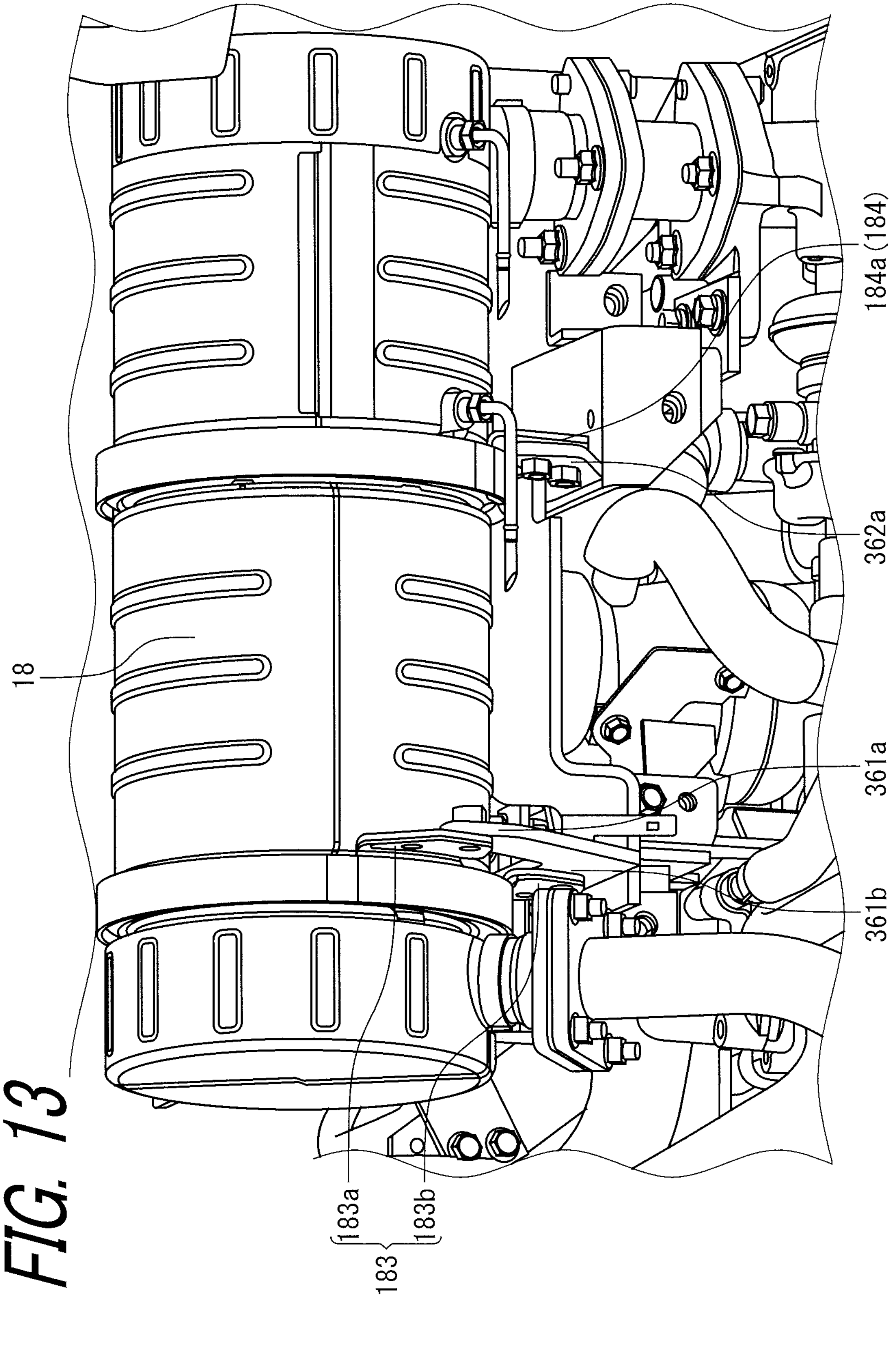
FIG. 13 is an enlarged perspective view of a portion around the second bracket to which the particulate remover is attached.

With reference to FIG. 10, the first support part 361 includes an upper support part 361*a* and a lower support part 361*b*. The second support part 362 includes a left support part 362*a* and a right support part 362*b*. FIG. 13 is an enlarged perspective view of a portion around the second bracket 36 to which the particulate remover 18 is attached. With reference to FIG. 13, the first flange 183 of the particulate remover 18 includes a leftward extension 183*a* and a downward extension 183*b*. With reference to FIGS. 13 and 3, the second flange 184 of the particulate remover 18 includes a down-leftward extension 184*a* and a down-rightward extension 184*b*.

As depicted in FIG. 13, the leftward extension 183*a*, the downward extension 183*b*, the down-leftward extension 184*a*, and the down-rightward extension 184*b* each have a through hole for a bolt. The upper support part 361*a* has a through hole corresponding to the through hole of the leftward extension 183*a*. The lower support part 361*b* has a through hole corresponding to the through hole of the downward extension 183*b*. The first flange 183 is attached to the first support part 361 with the leftward extension 183*a* fastened to the upper support part 361*a* by means of a bolt and a nut and the downward extension 183*b* fastened to the lower support part 361*b* by means of a bolt and a nut. The left support part 362*a* has a through hole corresponding to the through hole of the down-leftward extension 184*a*. The right support part 362*b* has a through hole corresponding to the through hole of the down-rightward extension 184*b*. The second flange 184 is attached to the second support part 362 with the down-leftward extension 184*a* fastened to the left support part 362*a* by means of a bolt and a nut and the down-rightward extension 184*b* fastened to the right support part 362*b* by means of a bolt and a nut.

Advantages of the Present Embodiment

The work vehicle 1 according to the present embodiment includes the oil separator 15 disposed between the engine 6 and the particulate remover 18. The oil separator 15 is thus disposed adjacent to the engine 6, and the blow-by-gas discharge pipe 31 is short in length and is disposed adjacent to the engine 6 and the particulate remover 18, so that blow-by-gas is warmed with heat generated by the engine 6 and the particulate remover 18. This disposition achieves reduction in the number of the heaters 32.

The present application refers to words "include" and derivatives as nonrestrictive terms for description of provision of constituent elements, without exclusion of any other constituent element not referred to in the present application. The same applies to words "have", "provided with", and derivatives thereof.

Expressions "member", "part", "element", "body", and "structure" may have a plurality of meanings indicating a single portion and a plurality of portions.

Ordinal numbers "first", "second", and the like are terms for simple distinction among configurations, without having any other meaning (e.g. specific order). For example, provision of a "first element" does not indicate provision of a "second element", and provision of the "second element" does not indicate provision of the "first element".

Expressions "substantially", "approximately", "about", and the like indicating degrees may each have a rational deviation not significantly changing a final result. All the numerical values referred to in the present application may be interpreted as including any one of the expressions "substantially", "approximately", "about", and the like.

In view of the above disclosure, the present invention can obviously include various modifications and alterations. The present invention may thus be implemented in any manner different from those specifically disclosed in the present application without departing from the spirit of the preset invention.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:

an engine;

a particulate filter connected to the engine to collect particulate matters contained in exhaust gas from the engine, the particulate filter being provided to overlap with the engine when viewed in a height direction along a height of the work vehicle, the particulate filter having a substantially tubular shape having a center axis along an axial direction that is substantially perpendicular to the height direction;

an oil separator connected to the engine via a blow-by-gas discharge pipe to catch a liquid component in blow-by-gas from the engine, the oil separator being provided between the engine and the particulate filter to overlap with the particulate filter when viewed in the height direction; and a fuel tank disposed above the engine and adjacent to the particulate filter in a lateral direction substantially perpendicular to the height direction and the axial direction, the oil separator being provided to overlap with the fuel tank when viewed in the lateral direction.

2. The work vehicle according to claim 1, wherein the axial direction matches an anteroposterior direction of the work vehicle.

3. The work vehicle according to claim 1, wherein the engine includes:

a crank shaft extending substantially perpendicularly to the height direction;

a cylinder block accommodating the crank shaft;

a cylinder head provided above the cylinder block in the height direction; and a cylinder head cover provided above the cylinder head in the height direction and having an outlet port provided in an outer surface opposite to the cylinder head in the height direction, the blow-by-gas being configured to be discharged via the outlet port, and the work vehicle further comprises the blow-by-gas discharge pipe connecting the cylinder head cover and the oil separator.

4. The work vehicle according to claim 3, wherein the oil separator is positioned above the cylinder head cover in the height direction.

5. The work vehicle according to claim 4, wherein the crank shaft extends substantially in parallel with the axial direction.

6. The work vehicle according to claim 5, wherein the particulate filter is provided to overlap with the cylinder head cover when viewed in the height direction, and the oil separator is provided to overlap with the particulate filter when viewed in the height direction.

7. The work vehicle according to claim 6, wherein the axial direction matches an anteroposterior direction of the work vehicle.

8. The work vehicle according to claim 7, wherein the cylinder head is positioned between a center of the oil separator and the fuel tank when viewed in the height direction.

9. A work vehicle comprising:

an engine;

a particulate filter connected to the engine to collect particulate matters contained in exhaust gas from the engine, the particulate filter being provided to overlap with the engine when viewed in a height direction along a height of the work vehicle; and an oil separator connected to the engine via a blow-by-gas discharge pipe to catch a liquid component in blow-by-gas from the engine, the oil separator being provided between the engine and the particulate filter to overlap with the particulate filter when viewed in the height direction, wherein the engine includes:

a crank shaft extending substantially perpendicularly to the height direction;

a cylinder block accommodating the crank shaft;

a cylinder head provided above the cylinder block in the height direction; and a cylinder head cover provided above the cylinder head in the height direction and having an outlet port provided in an outer surface opposite to the cylinder head in the height direction, the blow-by-gas being configured to be discharged via the outlet port, and the work vehicle further comprises the blow-by-gas discharge pipe connecting the cylinder head cover and the oil separator, and wherein the blow-by-gas discharge pipe includes:

an upright part connected to the cylinder head cover and extending in the height direction;

a first bent part connected to the upright part and bent toward the oil separator;

a linear part connected to the first bent part and extending diagonally upward; and a second bent part connected to the linear part and bent toward the oil separator to be connected to the oil separator.

10. The work vehicle according to claim 9, further comprising:

a heater provided at the linear part.

11. A work vehicle comprising:

an engine;

a particulate filter connected to the engine to collect particulate matters contained in exhaust gas from the engine, the particulate filter being provided to overlap with the engine when viewed in a height direction along a height of the work vehicle;

an oil separator connected to the engine via a blow-by-gas discharge pipe to catch a liquid component in blow-by-gas from the engine, the oil separator being provided between the engine and the particulate filter to overlap with the particulate filter when viewed in the height direction;

an air cleaner;

an inlet pipe connected to the air cleaner and extending toward the engine; and an additional blow-by-gas discharge pipe connecting the oil separator and the inlet pipe, the blow-by-gas processed by the oil separator being configured to be sent to the inlet pipe via the additional blow-by-gas discharge pipe.

12. The work vehicle according to claim 11, further comprising:

a turbocharger connecting the inlet pipe and the engine; and an exhaust pipe connecting the turbocharger and the particulate filter, the additional blow-by-gas discharge pipe being connected to the inlet pipe between the air cleaner and the turbocharger.

13. The work vehicle according to claim 12, wherein the engine further includes an oil pan provided below the cylinder block in the height direction, and the work vehicle further comprises an oil drain pipe connecting a lower end of the oil separator in the height direction and the oil pan.

14. The work vehicle according to claim 13, wherein no heater is provided on the additional blow-by-gas discharge pipe and the oil drain pipe.

15. The work vehicle according to claim 14, wherein the particulate filter has a substantially tubular shape having a center axis along an axial direction that is substantially perpendicular to the height direction, and wherein the particulate filter includes:

a first end attached to the exhaust pipe;

a second end opposite to the first end in the axial direction;

a first flange provided at the second end and radially extending with respect to the center axis; and a second flange provided substantially in a middle between the first end and the second end and extending radially with respect to the center axis, and the oil separator is positioned between the first flange and the second flange in the axial direction.

16. The work vehicle according to claim 15, further comprising:

a first bracket fixing the oil separator to the engine, wherein the first bracket includes:

an oil separator attachment part attached to the oil separator;

an engine connecting part connected to the engine;

an exhaust pipe connecting part connected to the exhaust pipe, a first beam extending upward in the height direction from the engine connecting part to the oil separator attachment part, and a second beam extending substantially in the axial direction from the oil separator attachment part to the exhaust pipe connecting part while bypassing the oil separator.

17. The work vehicle according to claim 16, further comprising:

a second bracket fixing the particulate filter on the first bracket, wherein the second bracket includes:

a first support part supporting the first flange and extending in the height direction, a second support part supporting the second flange and extending in the height direction, a first base plate provided on the first beam to support the first support part, the first base plate being a Z shaped material extending from the first beam to the second support part, and a second base plate provided on the second beam between the oil separator and the exhaust pipe to support the second support part, and the first base plate includes:

a base end connected to the first beam and positioned below an upper end of the oil separator in the height direction, and a tip end connected to the second support part and extending substantially in the axial direction, the tip end being positioned above the upper end of the oil separator in the height direction.

18. The work vehicle according to claim 8, further comprising:

a first heat insulating member provided between the fuel tank and the particulate filter and between the fuel tank and the oil separator; and a second heat insulating member between the engine and the fuel tank.

19. The work vehicle according to claim 9, wherein the particulate filter has a substantially tubular shape having a center axis along an axial direction that is substantially perpendicular to the height direction; and wherein the axial direction matches an anteroposterior direction of the work vehicle.

20. The work vehicle according to claim 19, wherein the oil separator is positioned above the cylinder head cover in the height direction.

* * * * *